United States Patent [19]

Weigert

[11] 4,164,552

[45] Aug. 14, 1979

[54] PREPARATION OF HYDROGEN CYANIDE

[75] Inventor: Frank J. Weigert, Wilmington, Del.

[73] Assignee: E. I. Du Pont de Nemours and Company, Wilmington, Del.

[21] Appl. No.: 905,970

[22] Filed: May 15, 1978

[51] Int. Cl.$^2$ .............................................. C01C 3/02
[52] U.S. Cl. .................................................... 423/376
[58] Field of Search ........................................ 423/376

[56] References Cited

U.S. PATENT DOCUMENTS

| | | | |
|---|---|---|---|
| 1,920,795 | 8/1933 | Jaeger | 423/376 |
| 2,706,675 | 4/1955 | Chatelain | 423/376 |
| 2,920,940 | 1/1960 | Kronacher | 423/376 |
| 3,231,600 | 1/1966 | Jones | 260/465 |
| 3,231,616 | 1/1966 | Jones | 423/376 |
| 3,658,471 | 4/1972 | Sperka | 423/376 |

FOREIGN PATENT DOCUMENTS 1143497 2/1963 Fed. Rep. of Germany ........... 423/376
47-21726 of 1968 Japan.

OTHER PUBLICATIONS

Kirk-Othmer, "Encyclopedia of Chemical Technology", vol. 6, pp. 576–581.

*Primary Examiner*—O. R. Vertiz
*Assistant Examiner*—Wayne A. Langel

[57] ABSTRACT

Hydrogen cyanide is produced by reacting a hydrocarbon having at least 3 carbons with ammonia at temperatures of 650°–950° C. in the presence of selected catalysts. Exemplary is the reaction of toluene with ammonia at 700° C. using a hydrogen exchanged faujasite catalyst.

10 Claims, No Drawings

PREPARATION OF HYDROGEN CYANIDE

DESCRIPTION

1. Technical Field

This invention relates to an improved process for making hydrogen cyanide. A hydrocarbon of 3 or more carbons, optionally containing nitrogen, is heated with ammonia at 650°–950° C. in the presence of an alumina-containing catalyst under nonoxidative conditions.

2. Background Art

Jones, et al. U.S. Pat. No. 3,231,600 produces aromatic nitriles from alkylaromatic compounds and ammonia at about 454° C. (850° F.) to 649° C. (1200° F.) using a refractory solid with heavy metal as the catalyst. These include faujasite (or similar zeolitic molecular sieves) in which the sodium or alkali metal form has been treated with selected metal to give catalyst containing at least 20% of heavy metal such as Zn and Cr.

Kamio, Jap. Patent Application Publication No. 21,726/68 reacts an alkyl substituted aromatic hydrocarbon such as toluene with ammonia at 900°–1200° C. using platinum or platinum oxide catalyst to give HCN and dealkylated aromatic (benzene).

The Andrussow process used for the preparation of HCN involves the ammoxidation of methane generally at 1000°–1200° C. over a Pt catalyst. It requires methane and is not useful with higher hydrocarbons.

The Degussa process reacts methane and ammonia using as catalyst Pt on sintered alumina at 1200°–1300° C.

The Shawinigin process uses an electric current in a fluidized coke bed at 1350°–1650° C. but can use propane in addition to methane.

DISCLOSURE OF INVENTION

The invention is the process of preparing HCN by reacting $NH_3$ in a nonoxidative atmosphere at 650°–950° C. with a hydrocarbon having at least 3 carbon atoms, optionally containing nitrogen, in the presence of a catalytically effective amount of catalyst of the formula

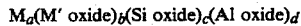

$$M_a(M' \text{ oxide})_b(Si \text{ oxide})_c(Al \text{ oxide})_d$$

wherein
M is Pd, Ir or Pt;
M' is Ag, Ce, Rare Earths, Cr, Cu, La, Mg, Ti, V, W, Zn, Zr;
d=1
a=0 or up to 5% of weight of oxides (b+c+d)
b=0 to 0.2
C=0 to 100
and recovering HCN.

This reaction can be illustrated by the equation for complete conversion of toluene to hydrogen cyanide

$$C_6H_5CH_3 + 7NH_3 \xrightarrow{\text{catalyst}} 7HCN + 11H_2$$

In the catalyst formula alumina can be used by itself but it is preferred that at least a, b or c have a value greater than zero, e.g. the alumina contains the above metals or metal oxides. The catalyst should be substantially free of alkali metals and stable at the temperatures used.

Suitable catalysts include selected zeolites; alumina, particularly as gamma or eta form; alumina combined with silica; alumina (or aluminum silicate) clays or oxide mixtures (e.g., chromia with alumina); or metals on alumina (e.g., Pd on $Al_2O_3$).

Preferred catalysts for producing HCN by the process of this invention are selected acidic zeolites or molecular sieves. These are a well-known class and can be prepared by substitution of metals such as rare earths or hydrogen for any alkaline metals in their structures such as faujasite or mordenite. The molecular sieves, preparation, properties, catalyst use, etc. are well-known in the art, e.g., Breck "Zeolite Molecular Sieves", John Wiley, N.Y., 1974.

The zeolite catalysts should be substantially free from alkali metals because they promote sintering with decreased activity and life under operating conditions. The zeolites are employed as the H or acidic modification or with suitable heavy metal cations such as rare earths to give useful catalysts.

Particularly preferred catalysts are the hydrogen forms of the faujasite or mordenite zeolites and alumina. Group II metals especially calcium; Group III such as lanthanum and the rare earths are especially useful for modification of the zeolites. Other zeolites that can be used are ferrierites, offretite and erionite, etc., whose preparation and properties are described by Rollman, J. Catalysis, 47, 131–121 (1977).

The metals Pd, Pt, and Ir are useful when in a finely divided state and with a large surface area on alumina or zeolites. They are obtained by means known to the art such as by mixing a solution of the metal salt with an alumina containing support and then reducing the metal salt solution to give the supported metal. This provides supported metal catalysts having a preselected metal content, preferably 0.1–5% although lower or high concentration can be achieved.

The catalysts can be naturally occurring or prepared synthetically by various methods. In the precipitation method of preparing the catalyst aqueous solutions of the desired constituents are mixed with a solution of a precipitating agent. A variety of bases or base forming compounds can be used for this purpose as for example aqueous ammonia, ammonium carbonate, ammonium bicarbonate, tetramethylammonium hydroxide, urea and the like. The presence of impurities in the final catalyst is minimized by carrying out the precipitation with dilute solutions and by using ammonia or ammonium salts as the precipitant along with nitrates of the desired metals. The resulting precipitate then requires a minimum of washing since any adsorbed material remaining can be removed in the subsequent calcination step. The use of nitrates is recommended since other anions such as sulfate or halide generally act as catalyst poisons. Where a metal halide or sulfate is used, it is important to wash the precipitated material thoroughly to remove such deleterious ions.

In the impregnation method, a solution of an active component or components such as a chromium salt is contacted with an alumina-containing support to thoroughly wet it. An excess of the impregnating solution may be used and when the support is saturated, the excess solution is removed, as by filtration or decantation. The impregnated support is then dried and subjected to calcination. The use of nitrate solutions is also recommended in this method.

In the evaporation method, the desired components such as alumina, or alumina with silica (for example an aqueous colloidal silica sol sold under the name Ludox ®) and a metal salt such as palladium nitrate are mixed together with water. The water is evaporated and the resultant solid is dried and calcined. This method is of value where unwanted materials are not present and a washing step is not needed.

In the calcination step which decomposes nitrates, carbonate, hydroxide, etc., to the oxides, the catalyst material is heated in air to a temperature which is generally below 800° C. The calcination is usually carried out for a period of hours, as, for example, overnight. When metal halides are used they can be activated by heating in a stream of hydrogen.

The zeolites can be obtained in crystal form as described in the art (e.g., Breck, cited above).

In the catalyst preparation, relatively small amounts of other metals from the main groups of the Periodic Table or one or more of the rare earths can be added as catalyst and/or textural promoters, i.e., to prevent undue loss of surface area of the catalyst.

The catalysts can be used by techniques which include continuous operations with a fluid bed or where the catalyst is present in two reactors which are sequentially used for production of HCN and reactivation of catalyst by burning off any carbonaceous deposit. The latter operation which can employ heated air or oxygen is an exothermic reaction and heat air or oxygen is an exothermic reaction and heat generated can be used in the endothermic part of the overall operation. Extremely high temperatures for this operation should be avoided since they may reduce activity of the catalyst system. More specifically, in this embodiment, the catalyst is present in two sequentially arranged and alternately operated reactors, spent catalyst in one of the reactors is reactivated by burning off carbonaceous deposit and the exothermic heat generated during burning of the deposit is utilized to heat the materials being reacted in the other reactor.

The organic compounds used for the preparation of HCN by the process of this invention have at least 3 carbons and include alkanes, alkenes, cycloaliphatics, aromatics, and alkylated aromatics, as well as compounds containing nitrogen such as amines and nitrile groups such as the picolines, aniline and pyridine, etc. Useful compounds include petroleum distillates, residual oils and shale oil fraction. Preferred for economic reasons are C-4 waste streams from ethylene cracking; gasoline or similar aliphatic hydrocarbons; and C-9 and -10 aromatic fractions from reformers. The feed-stock used should be stable in the vapor phase as introduced into the reactor. Many of these organic compounds can contain varying amounts of aldehydes, ketones, esters, alcohols and ethers as impurities but it is preferred to use starting materials which are as free as possible of such oxygenated compounds.

It is preferred to use commercial hydrocarbons such as gasoline as the organic compound because of ready availability.

Ammonia is introduced generally as a gas into the heated reactor. The amount of ammonia used for complete conversion is usually that calculated to be sufficient to convert all the organic material to HCN, that is, all of the carbon atoms of the organic material are converted to HCN. Thus if picolines or shale oil residues which contain nitrogen are used as the feedstock, less ammonia is needed than for the same weight of a hydrocarbon. Ratios of ammonia used can be within the range of 5/1 to 1/5 calculated as equivalent ratio of nitrogen to carbon atoms present. When lower N/C ratios are used, decomposition of ammonia is minimized and separation of excess $NH_3$ and HCN is facilitated, while high ratios prevent tar formation from the organic substrate. It is preferred that anhydrous conditions be maintained for the reaction.

The reaction can be carried out over a wide pressure range. In large scale reactions, superatmospheric pressure is advantageous to increase efficiency of equipment and catalyst contact. Pressures in the range of 0.5 to 20 atmospheres are particularly suitable but pressures of up to 100 atmospheres or higher can be used.

Hydrogen cyanide is produced when ammonia and the organic compound contact the catalyst at the reaction temperature. Any amount of catalyst can be used since it merely needs to be present in order for the reaction to occur, i.e., a catalytically effective amount is employed. The time during which the reactants are in contact with the catalyst at the reaction temperature is the contact time and can vary over a wide range, depending, e.g., upon the volume of the reaction column and rate of introduction of reactants. It can range from 0.05 second to 10 minutes or more although it is preferred that it be 1 second to 1 minute. Optimum contact time is dependent upon the specific catalyst used, the temperature employed, etc.

The temperature range is 650°–950° C. but the exact temperature can vary with the catalyst and the organic compound and extent of conversion desired. Generally, aromatic compounds and aliphatics are used at 750°–950° to produce HCN from all of the carbon while alkyl aromatics are used at 650°–750° C. to give HCN from the alkyl groups and also produce an aryl hydrocarbon. The specific optimum temperature can also depend on contact time and pressure.

When alkyl aromatics are used, e.g., toluene or xylene by choice of conditions, e.g., low temperatures and short contact times, benzene can be a major product along with HCN. This can be an economically desirable process for benzene production.

The reaction of the invention should be carried out in the absence of an oxidative atmosphere (air or oxygen). Reduced yield has been found with toluene when oxygen was present. A nonoxidative atmosphere can be readily obtained by raising the temperature of the reactor and its contained catalyst to the desired temperature and then flushing out the air with methane or nitrogen, etc., before introducing the reactants. Added inert diluents, such as nitrogen, methane, argon, etc., can be present but are unnecessary.

After passage of the gases through the catalyst bed or series of beds, $NH_3$ and HCN can be removed and the process streams can be cooled to condense any unused organic starting materials. The products may be separated by known methods such as extraction with appropriate solvents or absorption techniques and hydrocarbons or starting materials recycled.

A qualitative assay for HCN is as follows:

When effluent from the reaction is passed into a ferrous ammonium sulfate solution containing a small amount of ferric chloride and then acidified and heated, the development of a blue color, Prussian Blue, signifies the presence of HCN in the effluent. Neither ammonia nor methylamine interferes with this test. HCN concentrations of $10^{-5}$ M give a detectable response.

Quantitative analysis can be conducted by electrochemical analysis using a commercial cyanide specified electrode and a pH meter. However, a preferred procedure uses chromatography (GC). The procedure for single phase analysis of the entire effluent from the reactor involves passing the effluent through heated transfer lines into a sample valve with a 0.5 cc loop kept at 250° C. The gaseous sample is injected onto a 4'×¼" column of Porapak Q ® (cross-linked porous polymer beads sold by Waters Associates). The initial temperature of 120° C. is maintained for 2 minutes and then programmed to 240° at 32°/min with a He carrier flow of 25 ml/min. Response factors to convert peak areas to mole percent were determined for this method.

BEST MODE

A particularly preferred process for the preparation of HCN involves the use of commercial normally liquid hydrocarbons e.g., gasoline, with HY faujasite catalyst in a tubular reactor at about 825°–857° using ammonia at a ratio of about a mole per carbon atom, as exemplified by Example 2.

In the following representative examples all parts are by weight, temperatures are degrees Centigrade, and pressures are one atmosphere unless otherwise stated. In all the examples a general procedure was followed wherein the various catalysts, generally weighing about 2 to 6.5 grams, were charged into the middle section of a 12×150 mm Vycor ® tube heated at selected temperatures, the contained air being flushed out, and ammonia and organic compound being introduced at selected molar ratios. Quantitative analysis was by gas chromatography or by electrochemistry.

EXAMPLE 1

Using a tubular reactor charged with 3 g of HY faujasite (Linde 33-441 a product of Union Carbide) catalyst heated at 850°, a gaseous stream of ammonia at a rate of 1 mmole/min with various carbon containing substrates at 1 ml/hr (when liquid) or 1 mmole/min per carbon atom was introduced into the reactor. The following table shows results obtained for various compounds at the end of 30 minutes:

| Substrate | GC Analysis Mole % HCN in Exit Gas | Electrochemical HCN Analysis mmoles/min |
|---|---|---|
| Cyclohexane | 8.4 | 0.08 |
| Hexanes | 5.1 | 0.18 |
| 1-Butene | 3.9 | 0.26 |
| Isobutylene | 11.5 | 0.49 |
| Propane | 5.7 | 0.18 |
| Pyridine | 25.6 | 1.07 |
| Aniline | 17.2 | 0.71 |
| Allyl cyanide | 13.2 | 0.21 |
| Triethylamine | ~13 | 0.41 |

When methane was employed, no HCN was produced.

EXAMPLE 2

Using a tubular reactor charged with 3 g of HY faujasite catalyst at 850° C., the following table shows the mole percent of HCN obtained in the exit gas using a ratio of a mole of ammonia per carbon atom of the starting material. The gas hourly space velocity was about 1000 hr$^{-1}$.

| Hydrocarbon | Mole % HCN |
|---|---|
| Benzene | 21.5 |
| Gasoline | 20.4 |
| Toluene | 25.6 |
| Butene | 18.5 |
| Mixed C-9 aromatic | 12.6 |

| Hydrocarbon | Mole % HCN |
|---|---|
| hydrocarbons | |

EXAMPLE 3

Using the same catalyst and reactor as in the preceding example when 1.5–3 ml/hr of compound as liquid was introduced along with 30 ml/min of ammonia gas at a reaction temperature of 700°, at the end of 30 minutes HCN was produced as shown by the following table:

| Compound | Mole % HCN in Exit Gas |
|---|---|
| Toluene | 7.9 |
| Xylene (o,m,p) | 8.6 |
| Psuedocumene | 8.0 |
| Mixed C-8 Aromatics | 9.0 |
| Mixed C-9 Aromatics | 6.5 |
| γPicoline | 9.3 |
| Phenylacetylene | 5.5 |
| Diphenylmethane | 5.1 |
| 1-Methylnaphthalene | 4.6 |
| m-Toluonitrile | 15.6[b] |
| Benzene | 1.6 |
| Diphenylacetylene[a] | 3.4 |
| Stilbene[a] | 2.1 |

[a]saturated solution in Benzene
[b]includes HCN via hydrodecyanation

EXAMPLE 4

The following table shows different catalysts found effective for conversion of toluene to HCN and benzene. A tubular reactor was charged with 3 g of catalyst and while heated at 700°, gaseous ammonia and toluene was introduced at a ratio of 4 NH$_3$/toluene. The gas hourly space velocity was about 1000 hr$^{-1}$.

| Catalyst | Mole % HCN in Exit Gas |
|---|---|
| 86% TiO$_2$/14% Al$_2$O$_3$ | 1.7 |
| 10% V$_2$O$_5$/Al$_2$O$_3$ | 1.6 |
| 10% WO$_3$/Al$_2$O$_3$ | 4.2 |
| 19% Cr$_2$O$_3$/Al$_2$O$_3$ | 2.2 |
| 98% ZrO$_2$/2% Al$_2$O$_3$ | 0.5 |
| 0.5% Pd/Al$_2$O$_3$ | 1.7 |
| 0.5% Pt/Al$_2$O$_3$ | 2.0 |
| HY Faujasite[b] | 2.3 |
| 0.5% Ir/Al$_2$O$_3$ | 3.6 |
| 10% ZnO/10% Cr$_2$O$_3$Al$_2$O$_3$ | 2.6 |
| 0.5% Pd/REY Faujasite (RE = Rare Earth) | 4.9 |
| Cr$_2$O$_3$/SiO$_2$/Al$_2$O$_3$ | 3.1 |
| Zn/HY Faujasite | 2.6 |
| 12% Cr$_2$O$_3$/2% MgO/Al$_2$O$_3$ | 1.0 |
| 10% Ce$_2$O$_3$/Al$_2$O$_3$ | 3.2 |
| 24% ZnO/Al$_2$O$_3$ | 2.0 |
| 10% ZrO$_2$/Al$_2$O$_3$ | 3.5 |

[b]Flow rate doubled

In contrast to the above, other catalysts including Cr$_2$O$_3$, Cr/Zn/O, ZnO/Cr$_2$O$_3$, Ce$_2$O$_3$, Zn$_3$(PO$_4$)$_4$, 2% Pd/C, 1% Pd/SiO$_2$ and the commercial Andrussow Pt catalyst gave no HCN.

EXAMPLE 5

A tubular reactor was charged with about 3 g of catalyst. After heating to reaction temperature, ammonia and toluene were introduced at rates of 20 ml/min (NH$_3$) and 2.7 ml/hr (C$_7$H$_8$). The following table shows the temperature and conversion to HCN (based on reaction of toluene to give benzene and HCN) at various temperatures after 30 minutes of reaction.

| Catalyst | Temperature °C. | Mole % HCN in Exit Gas |
|---|---|---|
| Zn/HY Faujasite[a] | 650 | 1.5 |
| Mg/HY Faujasite[a] | 650 | 2.4 |
| Zn/Mordenite | 650 | 6.0 |
| HY Faujasite | 650 | 5.1 |
| HY Faujasite | 700 | 5.9 |
| H Mordenite | 700 | 4.0 |
| H Mordenite (Si/Al = 70) | 650 | 3.6 |
| H Mordenite (Si/Al = 37) | 650 | 0.9 |
| Zn/H-Y Faujasite | 725 | 12.0 |
| Ti/H-Y FAujasite | 650 | 3.5 |
| Cu/H-Y Faujasite | 650 | 6.6 |
| Cr/H-Y Faujasite | 650 | 5.4 |
| La/H-Y Faujasite | 650 | 4.7 |
| Pd/H-Y FAujasite | 650 | 5.7 |

[a]Rate reduced to about ½ of others

EXAMPLE 6

The general procedure of Example 5 was repeated using HY faujasite at 700° at a ratio of ammonia to toluene of 4/1 and a contact time of 4 seconds. After 1.5 hour on stream there was 100% conversion of toluene forming 90% benzene, 4% benzonitrile, 6% coke with 80% of expected HCN.

EXAMPLE 7

The following table shows varying temperature, reactant ratio of NH$_3$/toluene and contact time using H-Y Faujasite to give benzene and HCN from toluene (T).

| Catalyst Wt. g | NH$_3$ ml/min | Toluene ml/hr | NH$_3$/T Ratio | Temp. °C. | Mole % HCN in Exit Gas |
|---|---|---|---|---|---|
| 3 | 40 | 10.8 | 1 | 700 | 3.3 |
| 6 | 20 | 5.4 | 1 | 700 | 6.3 |
| 6 | 32 | 2.2 | 4 | 700 | 8.3 |
| 3 | 64 | 4.4 | 4 | 700 | 11.8 |
| 3 | 20 | 2.7 | 2 | 650 | 5.2 |

EXAMPLE 8

The following table shows space time yields (STY) in mg HCN/g catalyst/hour for conversion of toluene to HCN at different temperatures and catalysts using the general procedure of the preceding example. The ratio of ammonia to toluene was about 1/5.

| Catalyst | Mole % HCN in exit gas | |
|---|---|---|
| | 650° | 750° |
| 0.5% Pt/Al$_2$O$_3$ | 0.5 | 2.1 |
| 86% TiO$_2$/14% Al$_2$O$_3$ | 0.7 | 0.5 |
| 19% Cr$_2$O$_3$/Al$_2$O$_3$ | 1.0 | 2.7 |
| γAl$_2$O$_3$ | 0.9 | 5.9 |
| 0.5% Pd/Al$_2$O$_3$ | 0.8 | 3.4 |

EXAMPLE 9

Toluene and ammonia at a ratio of 1:2 were passed (at a liquid hourly space velocity of about 1) over a fixed bed reactor of Zn/HY fajuasite at 725°. The mole % of HCN in the gas phase at various times was

| Time (min) | 10 | 20 | 30 | 40 | 50 | 60 | 90 |
|---|---|---|---|---|---|---|---|
| Mole % HCN | 6 | 10 | 12 | 11 | 9 | 8 | 5 |

EXAMPLE 10

The following tabulation shows results of use of various catalysts (3 g of each) at 850° in a tubular reactor through which benzene was introduced at a rate of 1.1 ml/hr, and ammonia at 24 ml/min with a gas hourly space velocity of about 560 hr$^{-1}$.

| Catalyst | Mole % HCN in Exit Gas |
|---|---|
| Cr$_2$O$_3$(19%)/Al$_2$O$_3$ | 1.7 |
| SiO$_2$(87%)/Al$_2$O$_3$ (amorphous) | 0.8 |
| H-Mordenite | 4.5 |
| 0.3% Pd/Al$_2$O$_3$ | 8.7 |
| TiO$_2$(86%)/Al$_2$O$_3$ | 14.4 |
| H-Faujasite | 11.5 |
| 0.5% Pt/Al$_2$O$_3$ | 22.6 |
| 0.5% Ir/Al$_2$O$_3$ | 25.7 |
| 17% Ag$_2$O/Al$_2$O$_3$ | 16.4 |
| 10% CeO$_2$/Al$_2$O$_3$ | 28.6 |
| η-Al$_2$O$_3$ | 29.9 |
| γ-Al$_2$O$_3$ | 13.7 |
| 10% La$_2$O$_3$/Al$_2$O$_3$ | 26 |

UTILITY

Hydrogen cyanide is a merchant chemical with many uses. As a gas it is used as a rodenticide and insecticide. It also finds many uses as a chemical reagent in the manufacture of pharmaceuticals, polymers, and the like.

I claim:

1. The process of preparing HCN by reacting NH$_3$ in a nonoxidative atmosphere at 650°–950° C. with a hydrocarbon having at least 3 carbon atoms, in the presence of a catalytically effective amount of a catalyst of the formula $$M_a(M' \text{ oxide})_b(\text{Si oxide})_c(\text{Al oxide})_d$$

wherein

M is Pd, Ir or Pt;
M' is Ag, Ce, Rare Earths, Cr, Cu, La, Mg, Ti, V, W, Zn, Zr;
d = 1
a = 0 or up to 5% of weight of oxides (b+c+d)
b = 0 to 0.2
c = 0 to 100;
and recovering HCN.

2. The process of claim 1 where the compound reacted with the ammonia is selected from the groups consisting of alkanes, alkenes, cycloaliphatics, aromatics, alkylated aromatics, amines, and nitriles.

3. The process of claim 1 carried out under anhydrous conditions.

4. The process of claim 1 wherein the catalyst is a zeolite.

5. The process of claim 1 wherein the catalyst is HY faujasite.

6. The process of claim 1 wherein the catalyst is H mordenite.

7. The process of claim 1 wherein the catalyst is alumina.

8. The process of claim 1 where the hydrocarbon is an alkyl aromatic and HCN and aryl hydrocarbon are recovered.

9. The process of claim 1 where all the carbon atoms of the hydrocarbon are converted to HCN.

10. The process of claim 1 wherein (a) the catalyst is present in two sequentially arranged and alternately operated reactors,
(b) spent catalyst in one of the reactors is reactivated by burning off carbonaceous deposit, and
(c) the exothermic heat generated during step (b) is utilized to heat the materials being reacted in the other reactor.

* * * * *